United States Patent [19]
Kim

[11] Patent Number: 5,192,212
[45] Date of Patent: Mar. 9, 1993

[54] FLEXIBLE HYPRESURFACE ORBITAL MODEL

[76] Inventor: Chong Kyu Kim, 2580 Coney Island Ave., Brooklyn, N.Y. 11223

[21] Appl. No.: 930,263

[22] Filed: Aug. 14, 1992

[51] Int. Cl.⁵ ............................................. G09B 23/08
[52] U.S. Cl. ................................... 434/302; 434/300; 434/291; 434/284
[58] Field of Search ............... 434/284, 285, 287, 288, 434/290, 291, 300, 302, 211

[56] References Cited

U.S. PATENT DOCUMENTS

D. 233,057  10/1974  Irvine ............................ 446/168 X
2,226,032  12/1940  Wahlberg ........................... 434/291
3,196,558   7/1965  Webb ................................. 434/291

Primary Examiner—John J. Wilson
Assistant Examiner—Jeffrey A. Smith
Attorney, Agent, or Firm—Richard L. Miller

[57] ABSTRACT

A hypersurface orbital model is presented that orbits a ball on a surface called a hypersurface. A stepper motor drive arrangement, with two-degrees of freedom, is used to change the hypersurface viewed by the ball as a function of time. System control is added to ensure that the ball will orbit in the proper orbit. Control consists of a stepper motor, a clock, a solenoid launcher and various logical circuits. Counters keep track of the period so that the exact rotational speed can be referenced to set the ball launcher.

8 Claims, 3 Drawing Sheets

$x = \rho \sin\phi \cos\theta$
$y = \rho \sin\phi \sin\theta$
$z = \rho \sin\phi$

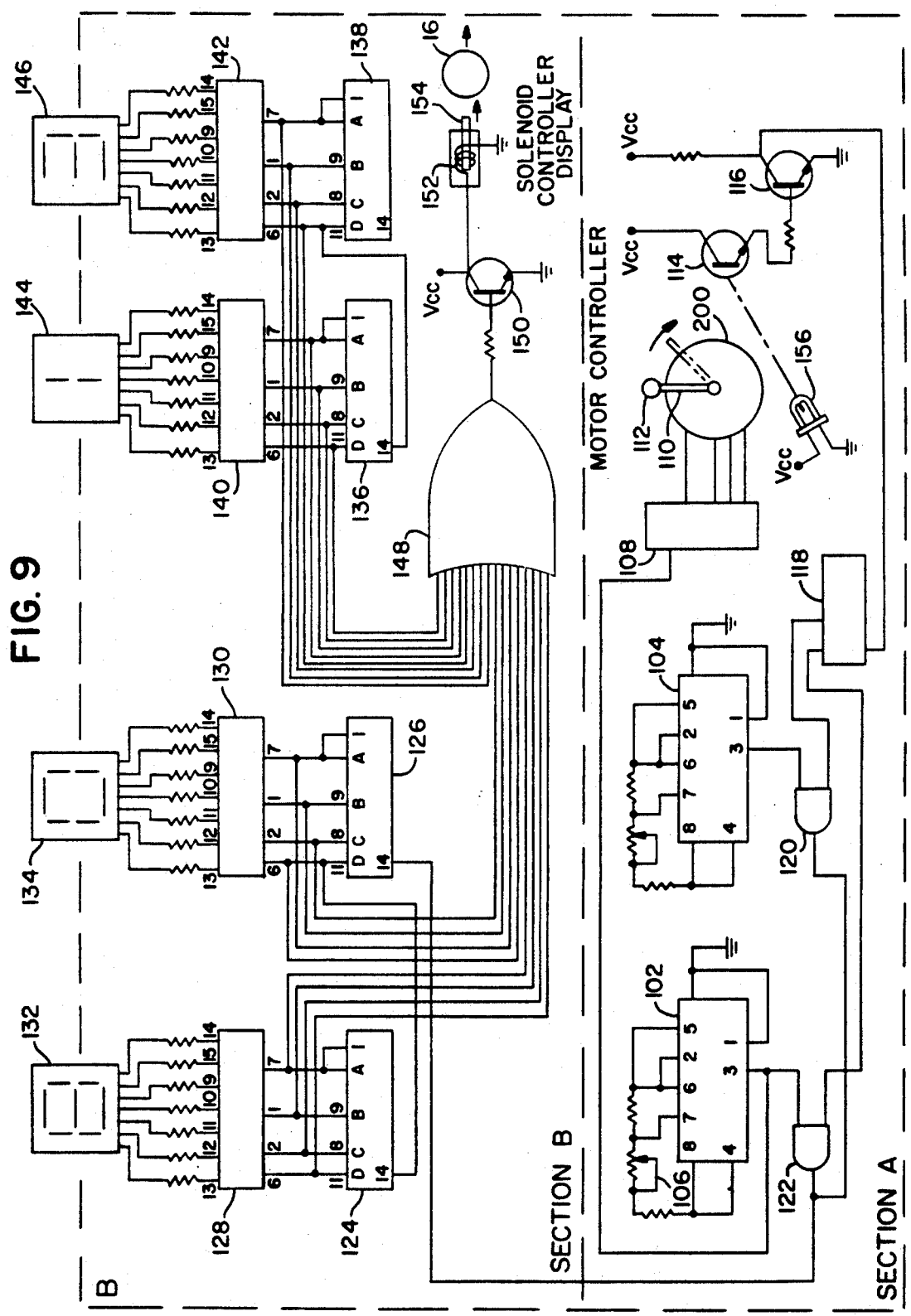

FLEXIBLE HYPRESURFACE ORBITAL MODEL

BACKGROUND OF THE INVENTION

The instant invention relates generally to the field of mathematical modeling and, more specifically, to models of planetary orbital systems used as research and teaching aids.

In many museums and planetariums, planetary motion is demonstrated by projecting a ball onto a hypersurface. A hypersurface is a three-dimensional sphere mapped into two-dimensional surfaces where surface area does not change. The hypersurface is somewhat conical in appearance. The model commonly seen at a museum uses a plastic mold shaped into a hypersurface. A ball is orbited around the hypersurface to simulate constant curvature in space, the hypersurface is presented as a fixed curvature and the ball orbits due to its presence. Due to the surface friction, the orbital path tends to decrease in radius. Eventually, the ball falls to the center of the hypersurface, thus ending the simulation. Although one can use this model to examine planetary orbits, the ball does not stay in orbit long enough to simulate actual planetary motion.

SUMMARY OF THE INVENTION

It is, therefore, a primary object of the present invention is to provide a hypersurface orbital model which launches a projectile sphere onto a hypersurface and keeps that sphere in constant orbital motion.

Another object is to provide a hypersurface orbital model whose hypersurface is automatically deformed such as to maintain the planetary motion.

A further object is to provide a hypersurface orbital model that automatically launches the projectile sphere at the correct velocity and time so as to be able to produce orbital motion anywhere on the hypersurface.

A still further object is to provide a hypersurface orbital model that is easy to construct, easy to operate, and easy to maintain.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

Figure 1:
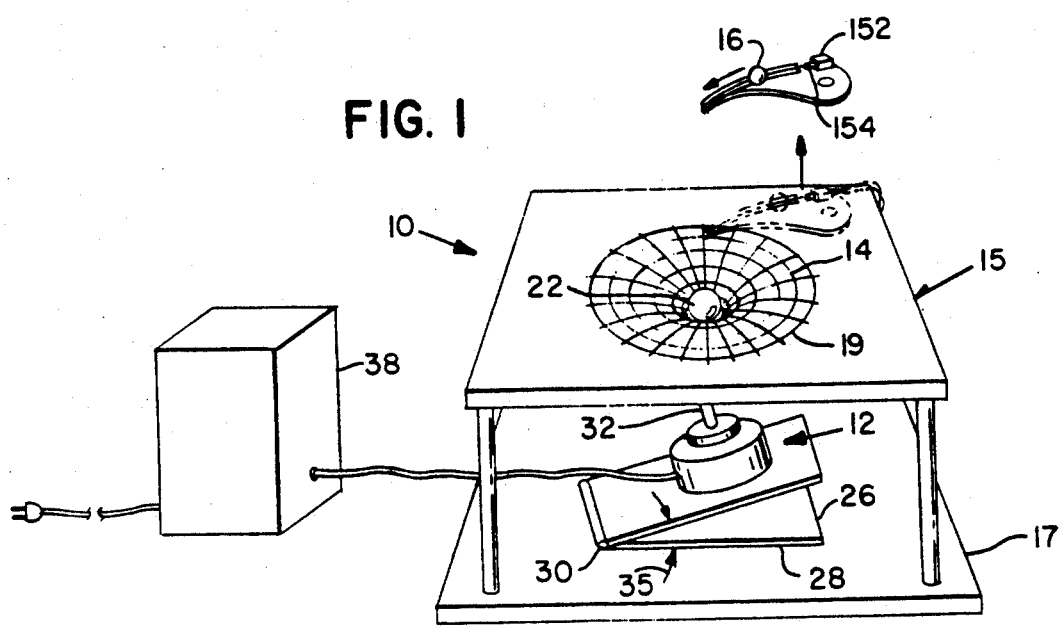
FIG. 1 is a diagrammatic perspective view of the instant invention at rest.
Figure 2:
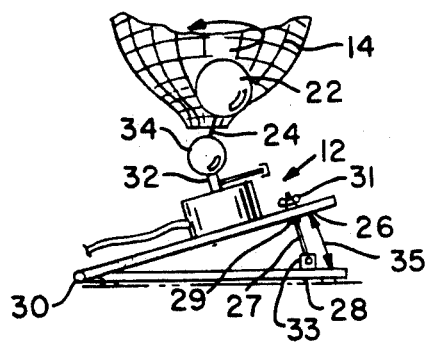
FIG. 2 is a partial diagrammatic view with parts broken away, showing the relative position of the spheres.
Figure 3:
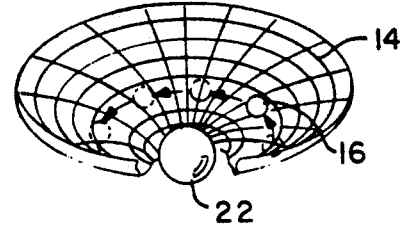
FIG. 3 is a partial diagrammatic perspective view showing the relative positions of a larger center sphere with respect to a smaller sphere which is freely moving thereabout.
Figure 4:
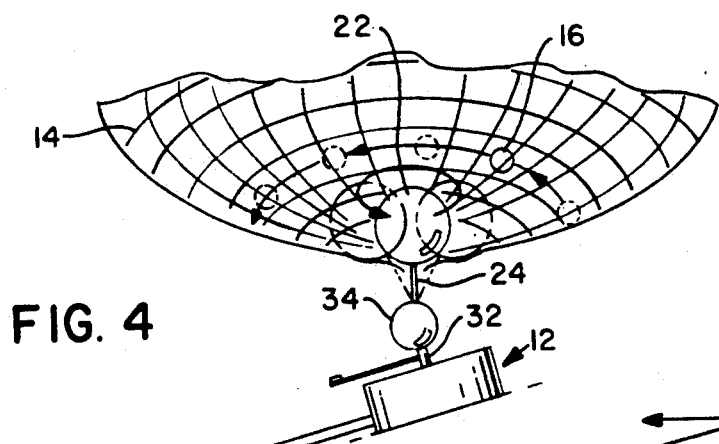
FIG. 4 is a diagrammatic enlarged partial view showing in greater detail the relative motion between spheres.

FIG. 9 Section - A is an electronic schematic diagram of the motor controller, and FIG. 9 Section - B is an electronic schematic diagram of the solenoid controller.

DETAILED DESCRIPTION OF THE PREFERRED EMBODIMENTS

Curvature is defined as the change in angle over change in distance ($d\theta/ds$). The ($d\theta/ds$) can also be written in terms of change in angle divided by change in distance at which both quantities are functions of time ($d\theta/ds = d\theta/dt \, / \, ds/dt$). In order to simulate the effects of the curvature, the physical model has to be fixed because of constant value of $d\theta/ds$. From the time space point of view, the actual simulation of $d\theta/ds$ requires an object to move in constant angular velocity which requires a motor to move the surface at specific locations. The rigid physical model currently used in museums has a hypersurface where $d\theta/ds = 0$ which means there is no motion involved on the hypersurface.

The model 10 in the instant invention which has a rigid frame 15 with a circular opening 19 presents a hypersurface 14 without constant curvature. The essence of the model is to simulate constant curvature using the hypersurface in a time space environment, thus agreeing more closely with four dimensional time space. This introduces time into this two dimensional hypersurface space: the stepper motor 12 deforms and repositions the hypersurface 14. A projectile sphere 16 is launched with a desired trajectory at a specific time so that the rate at which the hypersurface is moving is in equilibrium with the net vector of the projectile sphere. Using Riemmian Geometry, the location of the ball can be computed and the effect of mass on curvature can be observed. A mass is proportional to curvature in space due to gravity Since the hypersurface 14 is made out of nylon, small changes in the projectile sphere can affect the curvature of the hypersurface thus the projectile sphere creates a dent on the surface. This demonstrates that an independent hypersurface can affect other hypersurfaces.

Figure 6:
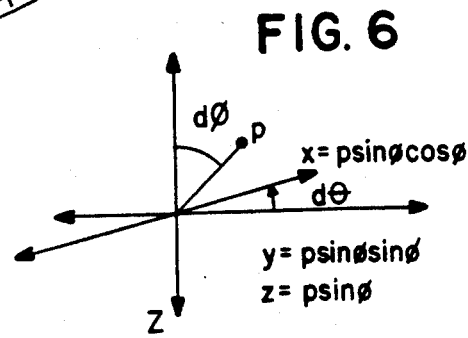
FIG. 6 is a vector diagram of the spherical coordinate system.

In order to represent planetary motion in terms of a moving mass the spherical coordinate system is used as illustrated in FIG. 6. This system is used to describe three dimensional space. In order to describe four dimensional space, this system can be expanded by taking the derivative with respect to each variable. This creates an orthogonal basis on the spherical coordinate system.

$$\frac{dx^j}{dx^h} = \begin{vmatrix} \frac{dx}{dp} & \frac{dx}{d\theta} & \frac{dx}{d\phi} \\ \frac{dy}{dp} & \frac{dy}{d\theta} & \frac{dy}{d\phi} \\ \frac{dz}{dp} & \frac{dz}{d\theta} & \frac{dz}{d\phi} \end{vmatrix}$$

where the inverse matrices can be noted as:

$$\frac{dx^h}{dx^j}$$

If dot products are applied to the above two matrices, the resultant diagonal matrix is called a kronka. Also note that:

$$\frac{dx}{dp} = \frac{dx}{dt} \frac{dt}{dp}$$

Each component is thus time varying. While the mathematical expression does not seem to relate to orbiting spheres, it is key in describing why a sphere can orbit on the hypersurface.

Positive definite case:

$$g(x) \frac{dx^h}{dx^j} \frac{dx^j}{dx^j} X^h Y^j = 1$$

A vector which has $|X|=1$ is said to have a unit length under the above equation where $X^j$ are variables and point P in space can be fixed. This represents a $(N-1)$ dimensional ellipsoid as $Y^j$ varies, and a new space is created due to gjh.

Using basic concepts from Riemmien space, planetary motion can be modeled in two dimensions. A spherical object is considered as a hypersurface, and the size of the hypersurface is determined based on the mass. Therefore, the Earth can be modeled as a small hypersurface relative to the sun's hypersurface. Obviously, motion and rotation of the sun creates changes in space $(d\theta/ds)$. Although the curvature is a constant scalar quantity, the sun is moving relative to a fairly distant star chosen as a reference.

In order to have an orbit, the angle at which space is moving has to be the same. The angle of the large hypersurface and small hypersurface in terms of their time-varying vector should be similar.

Figure 7:
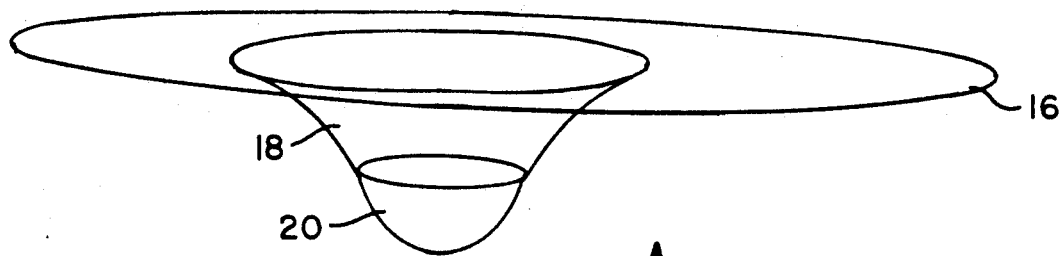
FIG. 7 is a perspective view of the hypersurface showing three layers of material.

Since the hypersurface 14 in the instant invention is simulated with constant curvature, the ground or base 19 of the frame 15 is the reference and the stepper motor 12 controls the curvature. The hypersurface is made out of three different layers 16, 18, and 20, of nylon that can be stretched to varying degrees (see FIG. 7). One piece can create a hypersurface but it can also contain some characteristics of the cervical surface. Using a three layer construction, the shape can be altered to create the best possible hypersurface.

Figure 5:
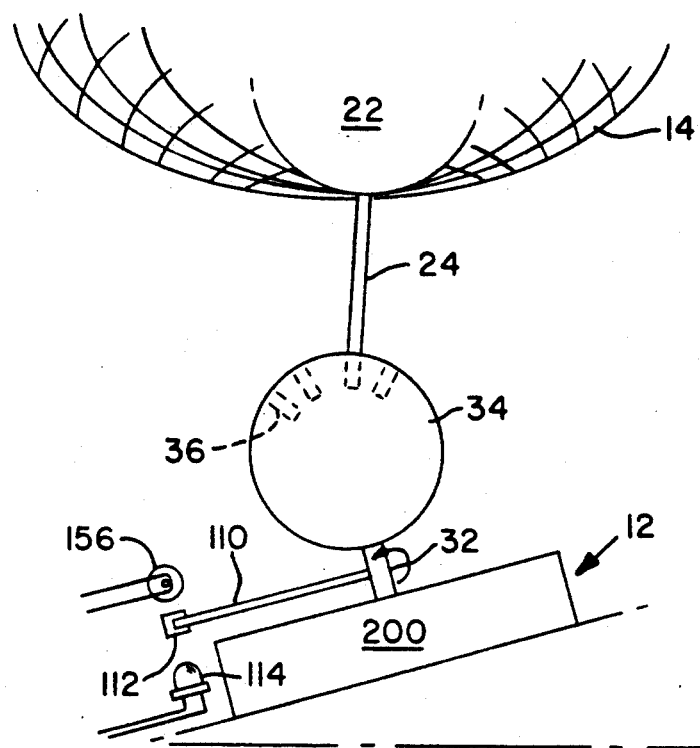
FIG. 5 is a detailed perspective view of the system for attaching the hypersurface deforming sphere to the stepper motor at selectable offset angles.

A hypersurface deforming sphere 22 is equipped with a shaft 24 that projects radially. The stepper motor 12 is mounted on a hinged plate 26 that is hinged to base 28 at hinge 30. An adjustment mechanism consisting of a nut 29, a wing nut 31 and a thread rod 27 is pivoted at bracket 33 to provide a way for changing angle 35. The shaft 32 of stepper motor 12 is permanently attached to offset adjust ball 34 (see FIG. 5). The offset adjust ball 34 has a number of radial holes typified by 36. The shaft 24 can be inserted into any of these holes allowing for flexibility in setting the offset angles. Shaft 24 protrudes through the hypersurface 14 and hypersurface deforming sphere 22 rests on the surface. Sphere 22 has two degrees of freedom, $d\theta$ and $d\phi$. The $d\theta$ is controlled by adjusting the speed of the stepper motor and the $d\phi$ is controlled by adjusting the offset angle.

Figure 8:
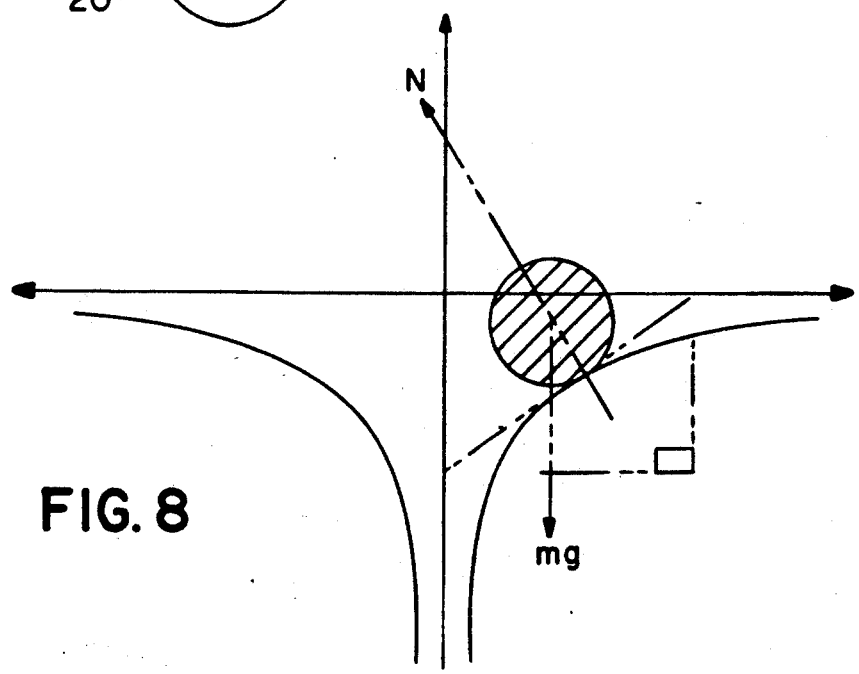
FIG. 8 is a two-dimensional graph of the hypersurface.

The speed of stepper motor 12 is chosen by using basic physics. Assuming the hypersurface is a two dimensional figure, the top portion of the surface is similar to the graph of $y=-k/x^2$ shown in FIG. 8. It is assumed that the motion of the curve creates a centripetal acceleration of $v^2/r$ where the radius changes relative to the value of x. The approximate acceleration can be computed by the ball rolling on a triangular hill whose orbit changes until it reaches the point where the orbit can exist (the maximum angle is $-90°$ while the minimum angle is $0°$). The optimum point where the orbit can exist will be at the vertex. This is the point where if the x value is less than the constant k, then the angle increases rapidly and if the x value is greater than constant k the angle decreases rapidly. The orbital angle relative to the axis is in the range of 45°. Therefore, the acceleration can be estimated as follows:

$$\frac{v^2}{r} = mg\sin(\theta + \Delta\theta)$$

Assuming the changes in the angle are very small, the period of the orbit can be computed:

$$\frac{2\pi r}{v} = T$$

$$T = \frac{2\pi r}{mg\sin(\theta + \delta\theta)}$$

Since the time computed is less than 2 seconds, the controller 38 must be designed to calibrate from one hundredth of a second to close to the minute range. Therefore, the step motion of the curve and the location of the orbiting ball 22 can be coordinated as a function of time. This method of computing is not exact, but it yields a range in which the controller's counter can be set and displayed.

The operation of the stepper motor controller is best understood with reference to FIG. 9 Section - A. There are two (Texas Instrument part number) NE555 timers 102 and 104. The speed setting potentiometer 106 is used to set the stepper motor speed. The output of 102 is the drive for the (Sprague Electric Company part number) UNC4202A stepper motor driver 108. The shaft of the stepper motor 200 has an arm 110 to which is attached a shutter 112 which interrupts light source 156 reaching phototransistor sensor 114. Phototransistor 114 is connected to transistor 116 to produce an RTL-compatible output. When the stepper motor operates, the output of transistor 116 are pulses corresponding to the rotation of the stepper motor. This output is divided down by the (Texas Instrument part number) SN7490AN divider 118. The output of NE555 timer 104 is ANDed with the output of divider 118 in AND gate 120 so that the output of 120 is only high when the timer pulse coincides with the SN7490AN output. The combined outputs of 120 and the ANDed (by AND 122) output of the SN7490AN (118) and the NE555 (102) are used to drive the solenoid controller and display (see FIG. 9, Section - B).

The output from FIG. 9, Section -A is used to drive SN7490AN counters 124 and 126. The BCD outputs of 124 and 126 are input to (Texas Instrument part number) SN7447AN display drivers 128 and 130 respectively which in turn operate numeric displays 132 and 134 respectively. In an analogous manner, SN7490AN counters 136 and 138 are input to SN7447AN display drivers 140 and 142 respectively to operate displays 144 and 146 respectively. The numerals on displays 132 and 134 are proportional to the number of rotations of the stepper motor. The numerals on displays 144 and 146 are steadily incremented references driven by the NE555 timers. When the desired number of counts has occurred, the output of OR gate 148 is input to solenoid driver transistor 150 to activate solenoid 152. The plunger 154 impacts with sphere 16 to launch it onto the hypersurface.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hypersurface orbital model, comprising:
   a) a large closed hypersurface made of a highly flexible material, wherein said hypersurface is supported by a rigid frame having a circular opening;
   b) means for creating a moving deformation on said large hypersurface such that said moving deformation produces a moving local hypersurface whose geometry is similar to said large hypersurface; and
   c) means for injecting a projectile sphere onto the surface of said large hypersurface such that said projectile sphere maintains a fixed orbit on the surface of said large hypersurface due to the initial trajectory of said projectile sphere and the movement of said deformation.

2. A hypersurface orbital model, as recited in claim 1, wherein said means for creating a moving deforming on said large hypersurface comprises a stepper motor mounted on a hinged plate, and a sphere attached at an adjustable offset at the end of said stepper motor shaft, wherein said sphere protrudes through the bottom of said large hypersurface, and said sphere rests on the surface of said hypersurface, such that when said stepper motor is activated a moving local hypersurface is formed on the large hypersurface.

3. A hypersurface orbital model, as recited in claim 2, further comprising a means for attaching the shaft of said stepper motor to said sphere with an adjustable offset means, wherein said adjustable offset means comprise an angle-setting ball attached to the shaft of said stepper motor, wherein said angle-setting ball has a multiplicity of radial apertures, whereby the shaft attached to said sphere may be inserted into the aperture in the angle-setting ball corresponding to the desired offset angle.

4. A hypersurface orbital model, as recited in claim 2, having a stepper motor controller means comprising, a timer, a stepper motor driver, said stepper motor, and means for regulating the speed of said stepper motor.

5. A hypersurface orbital model, as recited in claim 4, wherein said means for regulating the speed of said stepper motor comprises a shutter attached to the rotating shaft of said stepper motor, a light sensor placed in proximity to said light source, and electronic circuitry responsive to the output of said light sensor to maintain the speed of said stepper motor at some predetermined setting.

6. A hypersurface orbital model, as recited in claim 4, wherein said means for regulating the speed of said stepper motor comprises a light source, a shutter attached to the rotating shaft of said stepper motor, an optical sensor placed in proximity to said light source, and electronic circuitry that uses the output of said optical sensor to maintain the speed of said stepper motor at some predetermined setting.

7. A hypersurface orbital model, as recited in claim 1, wherein said means for injecting a projectile sphere onto the surface of said large hypersurface such that said projectile sphere maintains a fixed orbit on the surface of said large hypersurface comprises a solenoid that discharges said projectile sphere and control circuitry to fire said solenoid; wherein said control circuitry launches said projectile sphere at a time calculated to place said projectile sphere into a predetermined orbit on the surface of said large hypersurface.

8. A hypersurface orbital model, as recited in claim 7, wherein said control circuitry synchronizes the launching of said projectile sphere with the moving deformation of said large hypersurface.

* * * * *